Dec. 29, 1970  G. ROBINSON, JR  3,550,326
VIBRATION DEVICE AND METHOD WITH PARTS SEPARATION
Filed Feb. 23, 1968
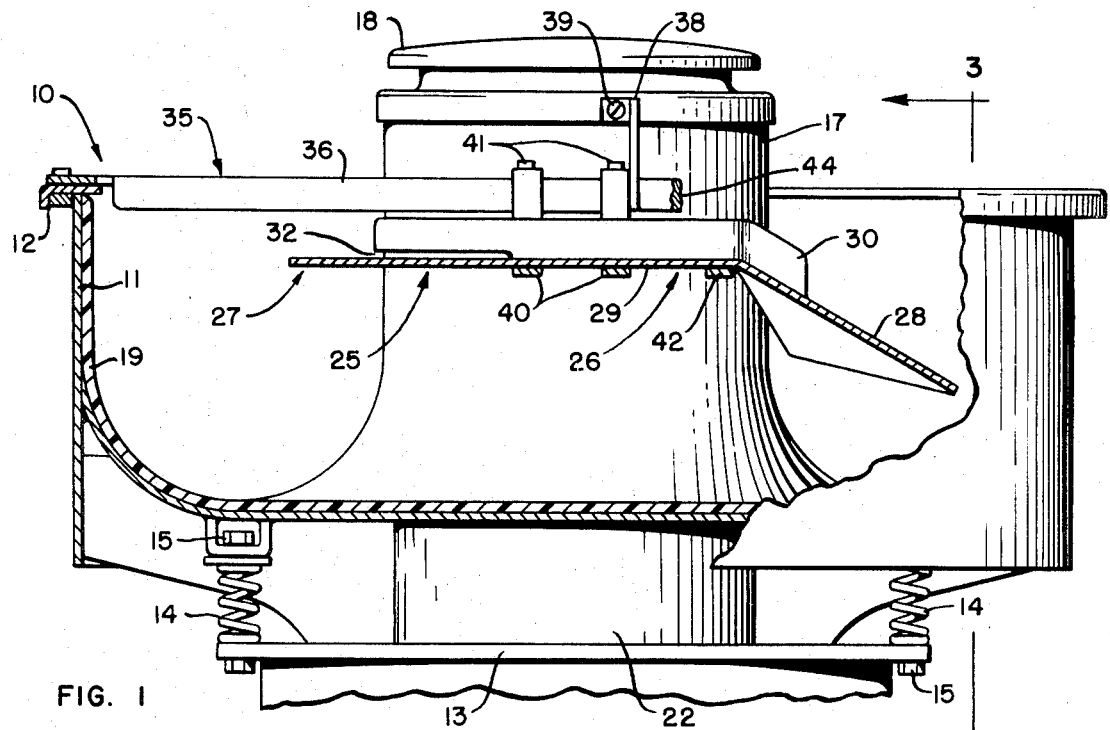
FIG. 1
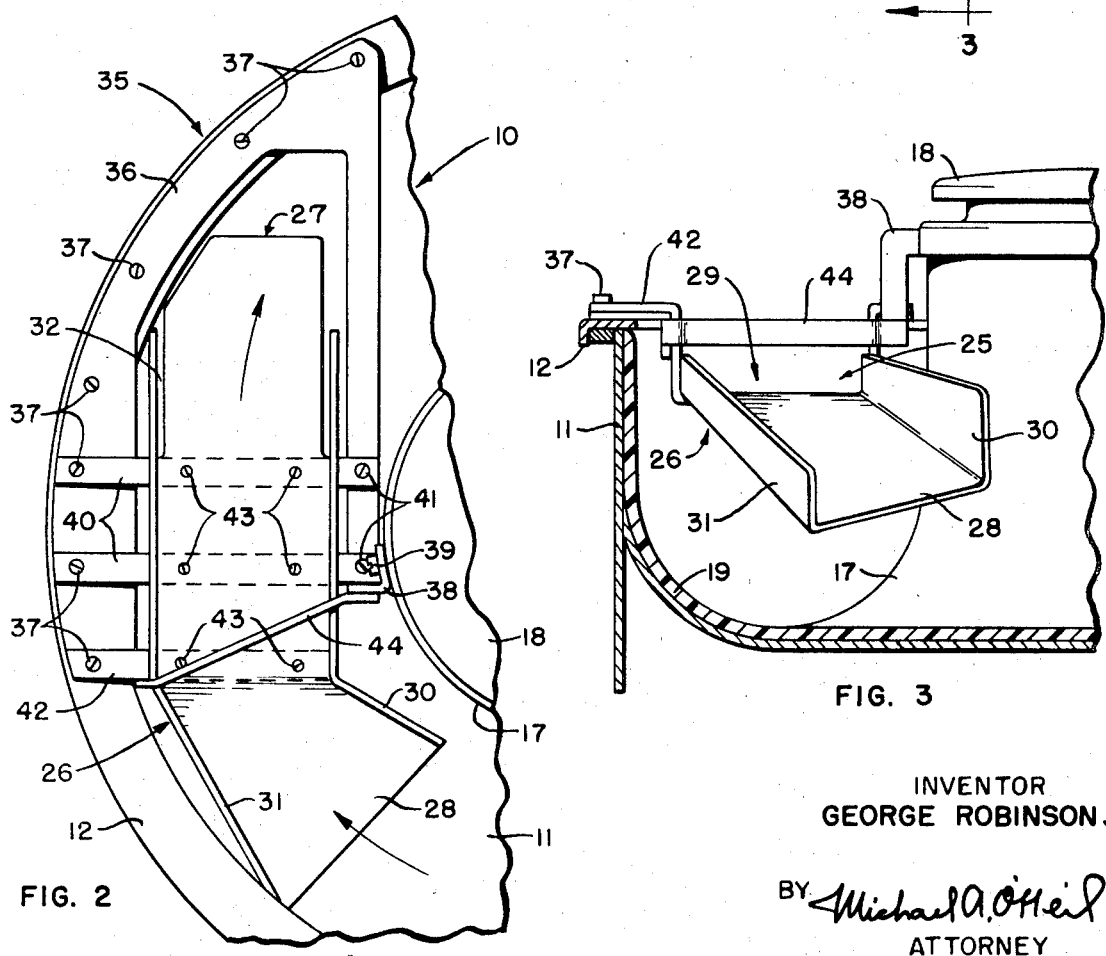
FIG. 2
FIG. 3
INVENTOR
GEORGE ROBINSON JR.
BY *Michael A. O'Neil*
ATTORNEY United States Patent Office 3,550,326
Patented Dec. 29, 1970

3,550,326
VIBRATION DEVICE AND METHOD WITH PARTS SEPARATION
George Robinson, Jr., Chicago, Ill., assignor to Teletype Corporation, Skokie, Ill., a corporation of Delaware
Filed Feb. 23, 1968, Ser. No. 707,644
Int. Cl. B24b 31/00, 1/00
U.S. Cl. 51—163                                   2 Claims

ABSTRACT OF THE DISCLOSURE

A parts separating device and method for a rotary tumbler comprises a ramp positioned within the tumbler and having a flexible platform extending from its upper end. The operational vibrations of the tumbler cause parts to travel up the ramp and cause the platform to vibrate rapidly, thereby separating the parts that have traveled up the ramp to the platform before the parts fall off of the platform.

BACKGROUND OF THE INVENTION

Vibration mills are devices that tumble mixtures of parts to be finished with stones, ceramic balls, metal oxide chips and similar hard objects along an annular helical path to deburr, polish, etc. the parts by the pounding action of the stones, etc. A problem that frequently occurs in the use of vibration mills, especially when such mills are used to finish flat parts, is that the parts tend to stack together like cards in a deck, thereby preventing the stones, etc. from contacting the parts. Parts stacking decreases the efficiency of vibration mills because it necessitates manual separation of the parts in the mill and because it lengthens the amount of time a mill must be operated to accomplish a desired amount of finishing.

SUMMARY OF THE INVENTION

In the preferred embodiment a device for automatically separating stacked parts in a vibration mill is comprised of a platform, positioned just above a vibration mill for vibrationally separating stacked parts, in combination with a ramp for conveying the parts from the mill to the platform.

DESCRIPTION OF THE DRAWINGS

A more complete understanding of the invention may be had by referring to the following detailed description when taken in conjunction with the drawings wherein:

FIG. 1 is a front view of a vibration well equipped with a parts separating device employing the present invention in which certain parts have been broken away more clearly to illustrate certain features of the invention;

FIG. 2 is a partial top view of the vibration mill shown in FIG. 1; and

FIG. 3 is a sectional view taken along the line 3—3 in FIG. 1 in the direction of the arrows.

DETAILED DESCRIPTION

Referring now to the drawing, wherein like reference numerals designate like parts throughout the several views, and referring particularly to FIG. 1, there is shown a vibration mill 10 of the type adapted to receive mixtures of parts formed from metals, ceramics, plastics, etc. and objects such as stones, ceramic balls, metal oxide chips and the like and to perform deburring and polishing operations on the parts by tumbling the mixture so that the objects collide with the parts. The vibration mill 10 is comprised of a tub 11 having a rim 12 that is supported on a base 13 by a plurality of springs 14 and that is retained on the base 12 by a plurality of bolts 15 each extending through one of the springs 14. The vibration mill 10 also includes a center column 17 having a lid 18 positioned on it. The center column 17 has sloping sides that cooperate with similar sloping sides with the tub 11 to form an annular mixture receiving cavity having a generally semi-circular bottom wall and generally vertical side walls. The entire interior of the annular cavity formed by the tub 11 and the center column 17 is lined with a resilient liner 19 formed from rubber or the like.

The center column 17 extends downwardly to form an extension 22 that comprises a housing for the motor (not shown) of the vibration mill 10. The motor is equipped with eccentric weights (also not shown) so that as the motor is operated the weights impart a vibratory motion to the vibration mill 10. This motion causes the mixture of parts and objects to follow an annular helical path about the center column 17, so that the mixture of parts and objects is tumbled over and over again as it progresses around the column 17. The vibration mills of the type shown in the drawing are sold by the Southwestern Engineering Company of Los Angles, Calif., and are identified by the company as Model FM-10-7 SWECO Vibro-Energy Finishing Mills.

Positioned within the annular cavity of the vibration mill 10 is a parts separating device 25 including a ramp portion 26 and a platform portion 27 extending therefrom. The ramp 26 is comprised of an inclined portion 28, a flat portion 29 and side walls 30 and 31. The inclined portion 28 extends downwardly into the annular cavity of the vibration mill 10 approximately half the distance from the top of a normal mixture of parts and objects that is placed in the annular cavity; however, the distance that the inclined portion 28 extends into the cavity may be varied in accordance with particular needs.

The platform 27 extends from the flat portion 29 of the parts separating device 25 and is separated from the side walls 30 and 31 by slits 32 so that it is relatively flexible compared to the relatively rigid ramp portion 26 of the parts separating device 25. In the parts separating device shown in the drawing the platform 27 is formed from the same material as the flat portion 29 of the ramp portion 26; however, in a given application the platform 27 may be formed from a different material having different dimensions and may be attached to the flat portion 29 by any suitable means. Also, in the device shown, both the ramp portion 26 and the platform 27 are formed from a solid material. However, if desired, suitable holes may be formed in either the ramp 26 or the platform 27 so that the objects of the mixture are separated from the parts thereof and fall back into the annular cavity.

The parts separating device is retained on the vibration mill 10 by a supporting frame 35 including a U-shaped member 36 that is attached to the rim 12 of the tub 11 by a plurality of screws 37, and that is attached to the lid 18 of the center column 17 by a hanger 38 that is welded to the U-shaped member 36, and that is attached to the lid 18 by a screw 39. As is best shown in FIG. 2, a pair of brackets 40 extend between the two legs of the U-shaped member 36. The brackets 40 are attached to the outer leg of the member 36 by two of the screws 37 and are attached to the inner leg of the member 36 by a pair of screws 41. A third bracket 42 extends from the outer leg of the U-shaped member 36, to which it is attached by one of the screws 37, under the ramp portion 26 of the parts separating device 25. The two brackets 40 and the bracket 42 serve to support the parts separating device which is attached to the brackets by a plurality of screws 43. The support frame 35 is strengthened by a cross bracket 44 that extends between, and that is welded to, the two legs of the U-shaped member 36.

In use, the motion imparted to the mixture of parts and objects by the vibration mill 10 causes a portion of the mixture to travel up the inclined portion 28 of the ramp 26 which, as is best shown in FIG. 3, extends partially around the column 17 so that it is in the path of travel of the mixture. The vibratory motion imparted to the vibration mill 10 by the motor (not shown) causes the entire vibration mill 10 to vibrate rapidly. This vibratory motion causes the relatively flexible platform 27 to vibrate rapidly relative to the ramp and the vibration mill, so that as the mixture of parts and objects travels up the ramp 26 and onto the platform 27 the mixture is vibrated rapidly by the platform 27. This causes any of the parts of the mixture which may have become stacked together to be shaken apart and, therefore, as the parts and objects fall off the end of the platform back into the annular cavity of the vibration mill 10 they are separate and ready to receive the benefits of the tumbling action of the vibration mill. In an actual device that has been constructed and put into practice, the platform 27 is formed from steel and has dimensions of approximately 9" x 7" x ⅟₁₆". Such a device serves adequately to separate flat parts formed from common punch press stock and having lengths and widths of up to several inches. Also, in the actual device it has been found that if the corners of the brackets 40 to 42 are strengthened by forming welding beads on them the service life of the device is substantially increased.

Although only one embodiment of the invention is shown in the drawings and described in the foregoing specification, it will be understood that the invention is not limited to that specific embodiment, but is capable of modification and rearrangement, and substitution of parts and elements without departing from the scope of the invention.

What is claimed is:

1. An improved vibration mill of the type including a tub for receiving a mixture of articles and abrasive material, a ramp attached to the tub and extending at a first end into the mixture of articles and abrasive and terminating at a second end at a point over the mixture, and means for vibrating the tub, and therefore the ramp, to impart motion to the mixture and to vibrationally convey a portion of the mixture up the ramp and over the second end of the ramp for recycling, wherein the improvement comprises:

a platform formed from a flexible material and attached to the second end of the ramp and otherwise freely suspended cantilever fashion, generally horizontally over the mixture, so that the vibrating means conveys the mixture along and over the platform and induces more rapid vibrations in the platform relative to the ramp to cause articles stuck to each other to become disengaged from each other as they pass over the platform and fall back into the tub for recycling.

2. In a process of abrasion finishing articles in a vibration mill, of the type wherein a mixture of the articles and an abrasive is placed in a tub having a ramp attached to the tub and extending at a first end into the mixture and terminating at a second end at a point over the mixture, so that at least some of the articles are vibrationally conveyed up the ramp and over the second end of the ramp for recycling as the mill is vibrated, the improvement which comprises:

differentially vibrating a platform located at the end of the ramp, the platform being fastened at one end to the ramp and otherwise freely suspended cantilever fashion, generally horizontally over the tub, the platform being of a relatively flexible material so that vibration of the mill and ramp induce more rapid vibration of the platform relative to the ramp, and separating stuck articles from each other by passing them along said platform to cause stuck articles to become disengaged from each other as they pass over the platform and fall back into the tub for recycling.

References Cited

UNITED STATES PATENTS

| | | | |
|---|---|---|---|
| 3,071,900 | 1/1963 | Balz | 51—163 |
| 3,161,993 | 12/1964 | Balz | 51—163 |
| 3,400,495 | 9/1968 | Balz | 51—163 |
| 3,407,542 | 10/1968 | McKibbon | 51—163 |

HAROLD D. WHITEHEAD, Primary Examiner

U.S. Cl. X.R.

51—313